Oct. 31, 1933.  C. B. FRANCIS ET AL  1,933,425
METHOD AND APPARATUS FOR SAMPLING LIQUID METALS
Filed March 27, 1933
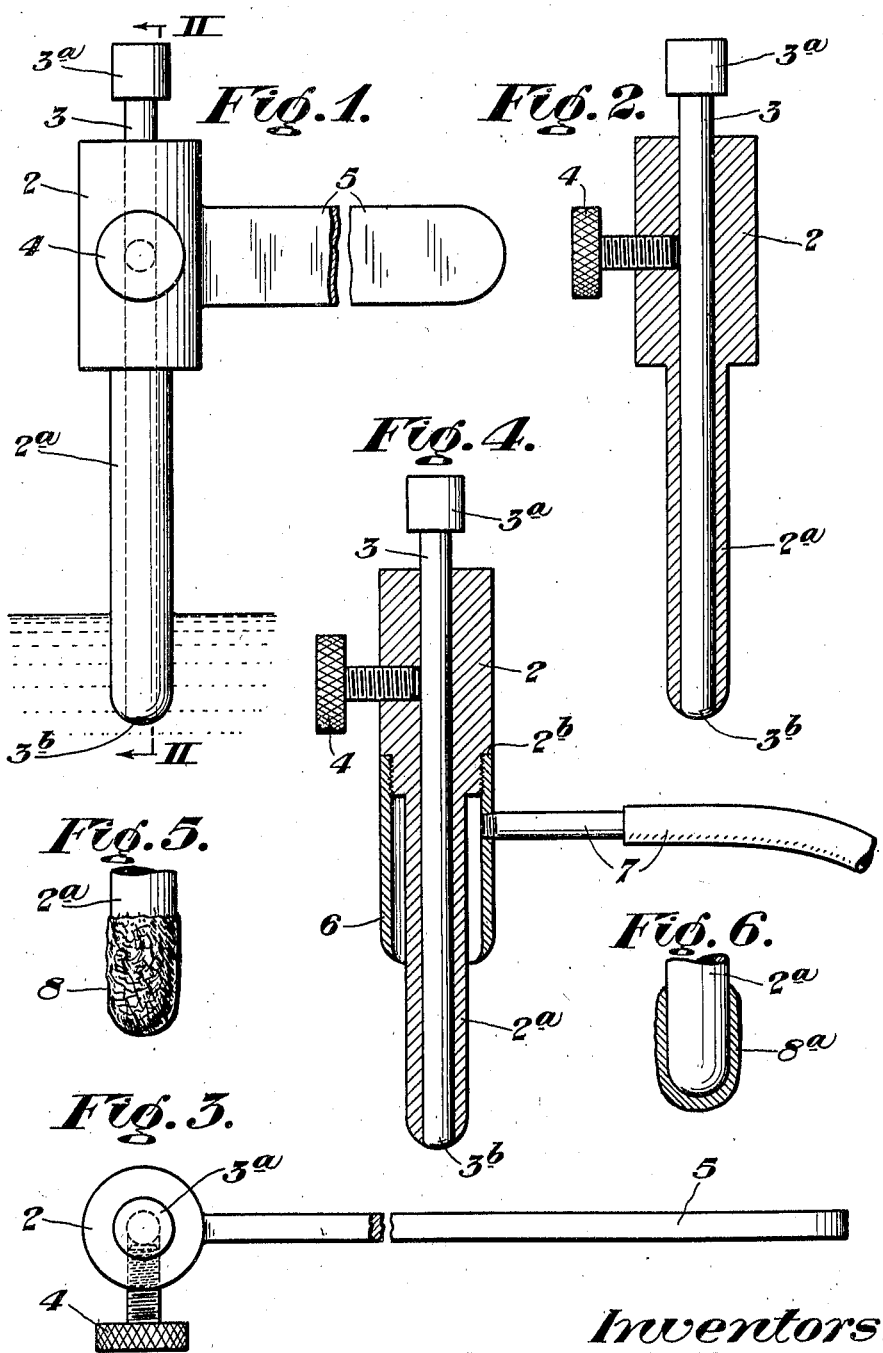
Inventors:
CHARLES B. FRANCIS and
PAUL B. GUYER
by: Usina Rauber
their Attorneys.

Patented Oct. 31, 1933

1,933,425

UNITED STATES PATENT OFFICE 1,933,425

METHOD AND APPARATUS FOR SAMPLING LIQUID METALS

Charles B. Francis, Pittsburgh, and Paul B. Guyer, Clairton, Pa.

Application March 27, 1933. Serial No. 663,036

6 Claims. (Cl. 266—1)

This invention relates to a method and apparatus for sampling metals in the liquid state.

In the production of metals, it has been the practice in the past to obtain a sample for test purposes with what is known as a "sampling spoon" from which the liquid metal is poured into a mold and allowed to solidify. In the sampling of steel, for example, the operations are as follows: If the steel has not already been deoxidized in the process of manufacture, a deoxidizer is generally added in the sampling spoon to obtain a sound test piece, any slag on the surface of the metal in the spoon having been previously skimmed off. The deoxidized liquid in the "spoon" is poured into a test mold of suitable size and shape, and allowed to solidify. This cooling ordinarily requires from approximately two to five minutes time, depending upon the size and shape of the mold. The solidified test piece is then removed from the mold and cooled, either by immersing it in, or spraying it with, water, or by permitting it to cool in the air, according to the composition of the metal and the desired hardening effect of cooling.

For example, samples of medium and high carbon, and certain alloy steels must be cooled in air, and in some cases annealed, to permit obtaining a suitable sample for analysis by drilling or machining. In cases of this sort, the cooling ordinarily requires from approximately five to twenty minutes. If the composition of the metal is to be estimated from the fracture, the test piece is broken and the fracture inspected.

If chemical analysis is required, the test piece is ordinarily drilled at one or more places, and a quantity of the drillings is used for chemical determinations. These operations require from approximately five to ten minutes, making the total time required for preparing the sample approximately seventeen to thirty minutes.

Samples taken in accordance with the practices of the prior art are subject to numerous defects which frequently lead to errors in the results of the analysis. In testing steel, for example, if the sample is not thoroughly deoxidized it will contain a number of blow-holes, which make it difficult to drill or to examine by inspection after fracture, and which also may affect the result of the analysis. On the other hand, if additions are made to the sampling spoon in order to deoxidize the sample and obtain a sound test piece, the composition of the metal is changed to some degree, depending, of course, upon the nature of the steel and the kind and amount of deoxidizer. Also, when the metal forms an alloy in the solid state and a sample of the usual size is poured from the metal in the liquid state, a certain amount of segregation occurs as the metal in the mold solidifies, so that the sample is not uniform in composition. For this reason drillings from the sample may, upon analysis, fail to be representative of the material.

In accordance with the present invention, a sample of the liquid metal is obtained which will be ready to test in approximately twenty to forty seconds, and one in which the dangers of error from blow-holes, additions of deoxidizer, segregation and included foreign matter is eliminated.

One object of the present invention is to provide a novel method and apparatus for obtaining a truly representative sample, in solid form, of liquid steel or other metals.

Another object is to obtain a solidified sample of a novel and extremely fine and lace-like formation which can be directly weighed for analysis or easily cut, crushed or broken into portions which may be weighed for analysis without further preparation.

A further object of the invention is to reduce the time necessary for sampling and the preparation of the sample for analysis to a minimum period, so that any analysis desirable as an aid in preparing the molten metal for tapping, or to meet certain required specifications, may be obtained with rapidity sufficient to enable its being of most use to the metallurgist.

These and further objects will appear after referring to the drawing, in which:

Figure 1 is a side elevation of the apparatus of the invention.

Figure 2 is a sectional end elevation.

Figure 3 is a plan.

Figure 4 is a section elevation of a modification.

Figure 5 is an elevation of an improved test article as produced in the practice of the invention.

Figure 6 is a sectional view of a modified form of the article of Figure 5.

Referring more particularly to the drawing, the numeral 2 indicates a cylindrical body portion of the invention, which is provided with an extended portion 2ª, of smaller diameter. The body portion 2 and extended portion 2ª are bored concentrically in order to accommodate a cylindrical ram 3, for sliding movement therein. The ram 3 is provided with an enlarged head 3ª at one of its ends and a rounded portion 3ᵇ, conforming to the contour of the end of the extended portion 2ª, at its other end.

A setscrew 4 is threaded into the main body portion 2, and acts to maintain the ram 3 in a preferred relative position with respect to the end of the extended portion 2ª, as shown on Figure 2 of the drawing. A handle 5 is secured to the body portion 2 in order to facilitate the handling of the device. To prepare a new device for use, the extended portion 2ª is heated until it begins to discolor. This coats the end with a thin coating of oxide, which prevents the liquid metal to be sampled from sticking to the steel of the tool or alloying with it.

In operation, the extended portion 2ª of the sampling device is heated to between 100° centigrade and 300° centigrade, depending upon the desired wall thickness of the test piece, and then immersed momentarily in the molten metal, which may be contained in a sampling spoon, although excellent results are obtained by direct immersion in the runner from the furnace or into any larger body of the liquid metal the surface of which is not covered with slag. The exact time the extended portion 2ª of the device is kept immersed in the liquid metal depends upon the desired wall thickness and weight of the sample to be obtained. After the extended portion 2ª is removed from the liquid metal the acquired coating is preferably chilled, as by quick immersion in cold water, in order to preclude the possibility of a formation of a slight film of oxide on the outer surface of the sample.

However, it is sometimes undesirable to dip the hot sample into water, and under these circumstances a modified form of the invention is provided for accomplishing the removal of the sample from the molten metal in a deoxidizing and noncombustible atmosphere.

Referring to Figure 4 of the drawing, this modification comprises a concentric sleeve 6 which is threaded in spaced relationship from the extended portion 2ª to the threaded portion 2ᵇ of the main body portion 2. The sleeve 6 is provided with an opening for receiving a suitable conduit 7 which is connected to a supply of compressed nitrogen, helium or other inert gas. The deoxidizing and non-combustible medium will flow from the sleeve 6 and prevent oxidation on the outer surface of the sample as it adheres to the extended portion 2ª of the body of the sampling device.

After the sample has solidified and cooled, it will have assumed a fine lace-like and thimble-shaped coating on the extended portion of the sampling device, as indicated at 8 in Figure 5, which is removed by loosening the setscrew 4 and hammering on the head 3ª of the ram. The wall thickness of the solidified sample may be increased, if desired, as shown at 8ª in Figure 6.

The novel sample of the invention presents an excellent object for test purposes and may be used in one piece or quickly divided into a number of portions by cutting with a pair shears, crushing in a mortar or breaking with the fingers.

While we have shown and described several specific embodiments of our invention it will be understood that we do not wish to be limited exactly thereto, since various modifications may be made without departing from the scope of our invention as defined in the following claims.

We claim:

1. The method of obtaining a solidified and lace-like sample of liquid metal which consists in heating a sampling device, momentarily immersing the same in the liquid metal, chilling the sample on the previously immersed sampling device and finally stripping the same from said device.

2. The method of obtaining a solidified and lace-like sample of liquid metal which consists in heating a sampling device to a temperature considerably lower than that of the metal to be sampled, momentarily immersing the same in the liquid metal, chilling the sample on the previously immersed sampling device and finally stripping the same from said device.

3. The method of obtaining a solidified sample from liquid metal which consists in heating a sampling device to a temperature considerably lower than that of the metal to be sampled, immersing the same in the liquid metal until a coating is obtained, removing the sampling device from said liquid metal while subjecting the coating to a deoxidizing and non-combustible atmosphere, permitting said coating to solidify while in said atmosphere and finally stripping the solidified sample from said device.

4. Apparatus for obtaining a solidified and lace-like sample of molten metal comprising a body portion having a concentric bore, a ram slidably disposed in said bore in such manner as to be adjustable with respect to one end of said concentric bore, and means for securing said ram in adjusted position.

5. Apparatus for obtaining a solidified sample from liquid metal comprising a body portion having a concentric bore, a ram slidably disposed in said bore, a setscrew for adjustably positioning said ram in said bore and a handle associated with said body portion.

6. Apparatus for obtaining a solidified sample from liquid metal comprising a body portion having a concentric bore, a ram slidably disposed in said bore, means for adjustably positioning said ram in said bore and means for providing a deoxidizing and non-combustible medium to and adjacent one end of said concentric bore.

CHARLES B. FRANCIS.
PAUL B. GUYER.